May 1, 1934.  A. W. LEVIE  1,957,219

GOVERNING MECHANISM FOR ELASTIC FLUID TURBINES

Filed Sept. 2, 1930

Inventor:
Archie W. Levie,
by Charles E. Tullar
His Attorney.

Patented May 1, 1934

1,957,219

UNITED STATES PATENT OFFICE 1,957,219

GOVERNING MECHANISM FOR ELASTIC FLUID TURBINES

Archie W. Levie, Schenectady, N. Y., assignor to General Electric Company, a corporation of New York Application September 2, 1930, Serial No. 479,260

13 Claims. (Cl. 264—14)

This invention relates to governing mechanisms, for controlling the speed of prime movers such as elastic fluid turbines and the like, particularly of the type usually termed "oil governors", because the actuating means for the moving parts of the governor is oil pressure, although it is not necessarily limited thereto.

In general, a governor of this particular type comprises an oil pump which is driven from the turbine, the speed of the pump varying with the speed of the turbine. A system of conduits and actuating members connect the pump to the valve which controls the admission of elastic fluid to the turbine, so that variations in the flow of oil from the pump, responsive to fluctuations in speed of the turbine, tend to open or close the valve. It has been found, however, that, with variations in the speed of the turbine and the pump, there is not a prompt response of the actuating members of the control, to operate the valve, these members lagging behind, in point of time, so that the valve does not open or close promptly. With "time lag" is meant the period of time which elapses between the movement of a governor or governing element and the achievement of the desired result, that is, until the controlled or regulated element, for instance a valve, has fully responded to the movement called for by the governor.

It is the object of my invention, therefore, to provide an improved construction and arrangement of the governing mechanism whereby to obviate the disadvantages above referred to.

According to my invention I provide in combination with an ordinary regulating mechanism including a controlled element such as a valve and a controlling element such as a speed responsive device, means which are actuated in response to the movement of the controlled element for accelerating the action of the governing mechanism in terms of rate of movement of the controlled element. The governing mechanism may also include a motor such as a hydraulic motor which is regulated or moved by the speed responsive device through the intermediary of a control member such as a pilot valve.

For a better understanding of what I believe to be novel and my invention, attention is directed to the accompanying description and the claims appended thereto.

Figure 1:
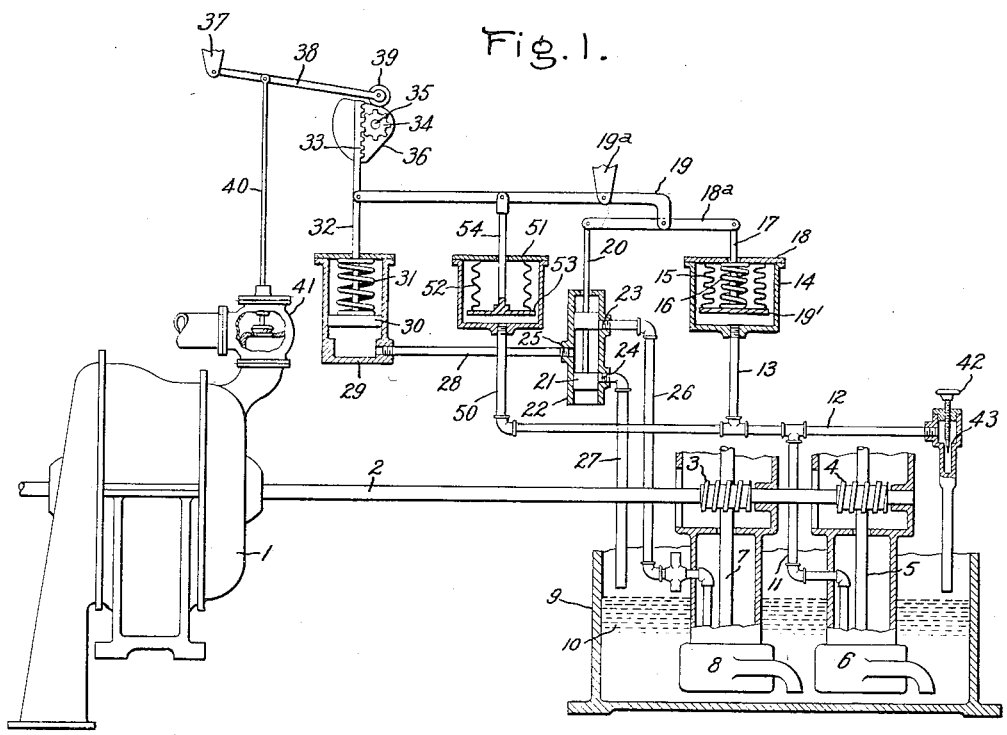
Figure 2:
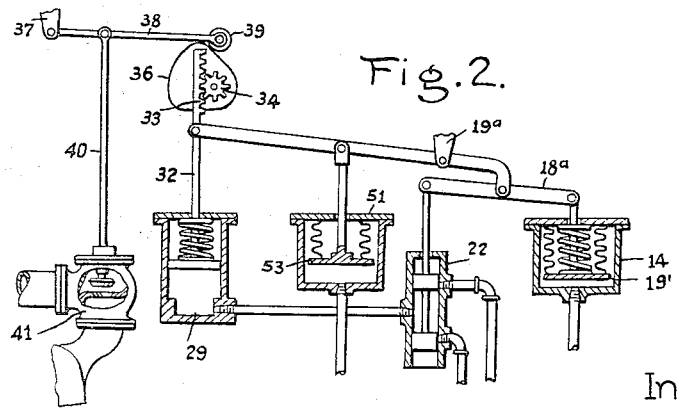

In the drawing, Fig. 1 is a diagrammatic view of a governing means embodying my invention and Fig. 2 is a view showing the governing mechanism in a different position.

Referring to the drawing, the turbine 1 is shown as driving the shaft 2, carrying the worm pinions 3 and 4. The shaft 5 of the pump 6 has a worm gear, (not shown), which meshes with the worm pinion 4, while the shaft 7 of the pump 8 also has a worm gear thereon (not shown) meshing with the worm pinion 3. The pumps are shown as positioned in a tank 9 having a supply of oil 10. A conduit 11 leads from the pump 6 to supply oil to a second conduit 12 which is connected by conduit 13 to a casing 14. In this casing there is provided a bellows 15 loaded by spring 16. While I show and describe member 15 as a bellows, it is to be understood that a piston or equivalent member may be substituted therefor. A stem 17 extends through the upper plate 18 of the casing 14 into the bellows where it is attached to the plate 19' forming the lower plate of the bellows structure. The pump 6 together with the device just described which may be termed a pressure responsive device define a regulating element for the turbine as will be more clearly understood from the following:

The stem 17, at its free end, is pivotally connected to a floating lever 18$^a$, pivoted intermediate its ends to the lever 19. At its other end the lever 18$^a$ is pivotally connected to the stem 20 of a control member of pilot valve 21, which operates in the valve casing 22. In the casing 22 are formed the inlet port 23, the discharge port 24 and the outlet port 25. Oil is supplied from the pump 8 through the conduit 26 and through the inlet port 23 to the valve casing 22. A conduit 27 connects the discharge port 24 with the tank 9. The outlet port 25 is connected by a conduit 28 with the lower end of a casing 29 and serves to supply oil beneath a piston 30 operating in the casing against the spring 31 therein, which surrounds the piston rod 32 and is positioned between the upper face of the piston and the upper wall of the casing. The piston rod extends through the casing and, intermediate its ends, is pivotally connected to the lever 19, which is pivotally mounted on a fixed support 19$^a$. The free end of the piston rod is formed as a rack 33, the teeth of which mesh with the teeth of the pinion 34 mounted to rotate with the cam shaft 35 carrying thereon the cam 36. Pivoted to a fixed support 37, is a rod 38 having, at its free end, a cam roller or follower 39, which rides on the cam 36. Intermediate the ends of the rod 38 is pivoted the stem 40 of the admission valve or controlled element 41 of the turbine. At 42 is shown a relief valve controlling the discharge orifice 43, this relief valve serving to regulate the amount of pressure in the governor system.

The structure so far described comprises a well known form of governor and acts to control the opening and closing of the valve 41 in the following manner. With the parts in the position shown in the figure the turbine will be operating at a definite speed. If now the load on the turbine should drop, the speed of the turbine will increase and the speed of the pumps will also increase so that there will be a corresponding increase of pressure in conduit 12 which will pass along conduit 13 to move the bellows 15 against the pressure of spring 16. This upward movement of the bellows will cause the lever 18$^a$ to pivot about lever 19 and the pilot valve 21 will move downwardly in the casing 22 connecting the discharge port 24 with the outlet 25, thus permitting the oil to flow out from under the piston 30, thereby permitting the piston to move downwardly by action of the spring 31. This movement of the piston will allow the rod 38 to pivot downwardly about its pivot on the support 37 and will carry the valve stem 40 with it, thereby closing the valve 41 against the admission of the elastic fluid to the turbine. If the load on the turbine should increase, the speed of the turbine will decrease and the parts of the governor will be actuated to raise the pilot valve to admit more oil beneath the piston 30 to cause it to move upwardly to open valve 41.

The mechanism described will function in an efficient manner to control the admission of elastic fluid to the turbine but it has been found that the various elements of the governor control, when caused to operate, due to a variation in the speed of the turbine, will not act as promptly as they should, but will lag behind resulting in a delay, in point of time, in opening or closing the valve 41. This delay is due to the fact that a sufficient volume of oil is not promptly added to or taken away from the casing 14 in order to actuate the diaphragm of bellows 15 to the required extent. With a variation in the speed of the turbine it has been found that there is not sufficient oil supplied to or drained off from the governor system to actuate the parts of the governor as quickly as they should be actuated, at that particular speed, and in order to obtain such movement of the parts, it is necessary to wait until the variation in the speed is much larger, so that for a given speed of the turbine, when there should be a given movement of valve 41, there is a lag or time delay in such movement of the valve, due to the fact that it is necessary to wait until there is an even greater variation in the speed of the turbine to cause the governor to actuate the valve 41 to the required extent.

I have found that I can eliminate this delay or lag in the movement of the parts of the governor and I accomplish it in the following manner. As pointed out above, with "time lag" I mean the period of time which elapses between a change of the speed or like condition of the prime mover and the positioning of a valve for regulating the supply of fluid to the prime mover in accordance with the change in speed or like changed condition of the prime mover. This time lag is due partly to the inertia of the various parts which have to be moved whenever a change in the conditions, such as the speed of the prime mover, occurs. In analyzing the time lag I have found that the major part of this time lag is due to the inertia of the fluid to be displaced in the pressure responsive device 14—18 if the speed of the turbine 1 and accordingly the pump 6 changes.

The governor of the embodiment shown in the drawing comprises the pump 6 which is driven by the turbine and has a discharge conduit 11, 12 provided with a bleed-off valve 42, 43 connected to a pressure responsive device 14—18. The pressure responsive device is subject to the pressure of the pump and is provided with a member 17 for moving the pilot valve 20, 21 for the motor 29—31 in terms of speed change of the turbine. Under normal conditions the pump 6 exerts a definite pressure in the discharge conduit 11, 12 which is determined by the turbine speed and the position of the bleed-off valve 42, 43. We may assume that the position of the bleed-off valve remains unchanged so that the pressure in the discharge conduit of the pump 6 varies in accordance with the change of the speed of the prime mover. The pressure in the discharge conduit and accordingly any change of this pressure are transmitted to the pressure responsive device which communicates through conduit 13 with the discharge conduit of the pump. It will be readily seen that a change in pressure in the discharge conduit due to a change in speed of the pump 6 causes displacement of fluid in the pressure responsive device. If, for instance, the speed of the pump 6 increases due to an increased speed of the turbine 1, more fluid is discharged from the discharge conduit. A portion of this fluid is conducted to the pressure responsive device causing further compression of the spring until the compression of the spring acting on one side of member 19' and the fluid pressure acting on the other side of member 19' balance. A certain period of time elapses until a sufficient amount of fluid is supplied to the pressure responsive device as the major portion of the increased discharge of fluid of pump 6 is conducted past the needle valve. The same condition exists if a decrease in speed of the prime mover takes place, causing a decreased discharge of fluid from the pump 6. This decreased discharge of fluid causes a displacement of fluid from the pressure responsive device through conduits 13, 12 past the needle valve.

In accordance with my invention I obtain a considerable decrease in the period of time necessary for the displacement of fluid to and from the pressure responsive device 14—18 by the provision of auxiliary means for permitting the displacement of fluid to and from the pressure responsive device in response to the movement of the motor 29—32. From another viewpoint, I provide a governor which comprises a pump, a pressure responsive device operated by the pump, and auxiliary means connected to the motor for accelerating the movement of the pressure responsive device, that is, for accelerating the displacement of fluid to and from the pressure responsive device in terms of movement of the motor. With the proper proportioning of the auxiliary means for accelerating the displacement of fluid to and from the pressure responsive device, little or no fluid is supplied from the discharge of the pump to the pressure responsive device in case of increased speed of the prime mover and little or no fluid is discharged from the pressure responsive device past the needle valve, but the displacement of fluid to and from the pressure responsive device is substantially accomplished by said auxiliary means. In case of increased speed, fluid is transferred from the auxiliary means to the pressure responsive device and vice versa in case of decreased speed. In other words, whereas with arrangements heretofore used the functions of the pump were to change the pressure in its discharge conduit in accordance with the change in speed of the prime mover and also to cause displacement of fluid in the pressure responsive device, with the new arrangement the second function of the pump, that is, the displacement of fluid in the pressure responsive device, is substantially accomplished by said auxiliary means, the pump serving merely to cause a change in pressure in its discharge conduit in terms of speed change of the prime mover and to initiate the displacement of fluid to or from the pressure responsive device.

In the embodiment of my invention shown in the drawing the conduit 12 carrying oil, pumped from the pump 6, is extended past the conduit 13 and by means of a conduit 50 is connected with a casing or tank 51 having therein a bellows 52, having the usual plate 53 and a rod 54, which, as shown, extends through the casing and is pivoted to the lever 19.

Referring now to the drawing, with the parts in the position shown, it is evident that with a drop in the load the turbine will speed up and that the governor will act to cause piston 30 to move downwardly in its cylinder closing the valve 41. It will be apparent however, that, when the piston 30 moves downwardly, it will carry the lever 54 downwardly with it and a sufficient quantity of oil will be forced out of casing 51 along conduits 50, 12 and 13 into casing 14 to move the plate 19' upwardly, the required distance. Thus the tank or casing 51 together with the bellows 52 and the blade 53 define a fluid space in the tank which communicates with the discharge conduit of the pump 6 and with the pressure responsive device. The movable member 52, 53 is connected to the fulcrumed lever 19 and serves to change the volume of the fluid space defined in the casing 51 in terms of movement of the fulcrumed lever 19. With the tank 51 and the movable member 52, 53 properly dimensioned the downward displacement of the plate 53 is substantially equal to the upward displacement of plate 19', the cubical contents of the governor system remains substantially constant and the pump 6 merely supplies the increased pressure necessary to move the plate 19' against the tension of spring 16 without having to supply any additional volumes of oil to the governor system, the excess volume of oil supplied by the pump, due to its increase in speed, being forced out past the needle valve.

If the turbine load increases, the mechanism operates as follows: The increased turbine load causes a decrease in speed of the turbine and accordingly of the regulating element, that is, of pump 6, to the effect that the fluid pressure in conduits 11, 12 and 13 decreases and allows a downward movement of the movable member 19' of the pressure responsive means under action of spring 16. The downward movement of movable member 19' effects lifting of the pilot valve heads, whereby head 23 uncovers its port and permits oil or like actuating fluid to be supplied to the lower part of the motor or hydraulic cylinder 29. Cylinder piston 30 thereby is moved upward and causes opening of the regulated element or valve 41. The upward movement of piston 30 of the hydraulic motor causes lever 19 to turn about its fulcrum 19ª in clockwise direction, to the effect that the pilot valve or control member is moved downward to resume its original position. The clockwise movement of lever 19 lifts the movable member 53 of the fluid containing means or tank 51 and thus permits fluid to be displaced from the pressure responsive means 14 through conduits 13, 50 into the cylinder or tank of the fluid containing means 51. It will be readily seen that the displacement of fluid between the pressure responsive means and the fluid containing means takes place as soon as the piston 30 of the hydraulic motor moves upward. The displacement of fluid between means 14 and 15 is thus responsive to the movement of piston 30 which in turn causes a similar movement of the valve or regulated element. The displacement of fluid between the above mentioned means causes accelerated action of the pressure responsive device and thereby shortens the time lag of the governing mechanism, that is, the time passing between a change of speed and the desired response to this change by the regulated element or valve.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is:

1. The combination with a hydraulic cylinder having a piston therein and a stem connected thereto for controlling the admission valve of an elastic fluid engine, a pilot valve for controlling the supply of a fluid to the cylinder, pumping means for supplying fluid to the pilot valve, a pressure responsive means having a movable member for controlling the pilot valve, a fluid pump having a discharge connected to the pressure responsive means, and a lever mechanism for connecting the pilot valve and the pressure responsive means with said stem, of a fluid containing means having a movable member connected to the lever mechanism and a conduit between the pressure responsive means and the fluid containing means to accelerate the movement of the movable member in said pressure responsive means by permitting displacement of fluid between the pressure responsive means and the fluid containing means in response to movement of said lever mechanism.

2. In a regulating mechanism, the combination with a controlled element and a governing mechanism connected thereto for moving the controlled element, of means connected to and actuated in response to the movement of the controlled element for accelerating the action of the governing mechanism in terms of movement of the controlled element.

3. In a regulating mechanism, the combination with a controlled element and a speed governing mechanism including a speed responsive device and means moved by the speed responsive device and connected to the controlled element for causing movement of the controlled element, of means connected to and actuated in response to the movement of the controlled element for accelerating the movement of the first named means.

4. In a regulating mechanism, the combination with a controlled element, a controlling element, and means connected between said elements and responsive to a condition of the controlling element for causing movement of the controlled element, of means connected to and actuated in response to movement of the controlled element for causing accelerated action of the first named means.

5. In a regulating mechanism, the combination with a controlled element, a controlling element, means connected to and responsive to a condition of the controlling element, and a motor including a control member connected to said means for moving the controlled element, of means connected to the motor and operated in terms of movement of the motor for accelerating the operation of the first named means.

6. In a regulating mechanism, the combination with a controlled element, a controlling speed responsive device, pressure responsive means connected to the device, said controlling device causing actuating fluid to be supplied to the pressure responsive means in terms of speed changes, and a motor connected to and controlled by the pressure responsive device for moving the controlled element, of means connected to and responsive to the movement of the controlled element for accelerating the supply of actuating fluid to the pressure responsive device in terms of movement of the controlled element.

7. In combination with a prime mover having a valve for regulating the supply of fluid thereto, a motor including a control member for moving the valve, follow-up means between the control member and the motor governing means driven by the prime mover for moving the control member in terms of speed changes of the prime mover, and means connected to the motor for accelerating the action of the governing means in terms of movement of the motor.

8. In combination with a prime mover having a valve for regulating the supply of fluid thereto, a motor for moving the valve, a pressure responsive device for controlling the motor, pumping means driven by and responsive to the speed of the prime mover for supplying actuating fluid to the pressure responsive device, and means for accelerating the movement of the pressure responsive device in response to the rate of speed change of the prime mover including an auxiliary tank having a diaphragm connected to the motor and a conduit connected to the pressure responsive device.

9. In combination with a prime mover having a valve for regulating the supply of fluid thereto, a hydraulic motor for moving the valve, a pump driven by the prime mover for supplying oil to the motor, another pump driven by the prime mover, a pressure responsive device having a movable member, a conduit having a bleed-off valve for connecting the pressure responsive device to the other pump whereby said member is moved in terms of speed change of the prime mover, a pilot valve connected to the movable member for controlling the supply of oil to the hydraulic motor, a follow-up lever connecting the pilot valve and the motor, a casing connected to said conduit and including a bellows having a portion connected to the motor for causing an accelerated movement of the movable member of the pressure responsive device.

10. In combination with a prime mover having valve means for regulating the supply of fluid thereto, a hydraulic motor for moving the valve means, means for supplying actuating fluid to the motor, a pilot valve for controlling the supply of actuating fluid to the motor, a follow-up lever connecting the pilot valve and the motor, a pressure responsive device for moving the pilot valve, pumping means driven by the prime mover and having a discharge conduit including a bleed-off valve connected to the pressure responsive device whereby the pressure responsive device is moved in terms of speed changes of the prime mover, means connected to the motor and communicating with the pressure responsive device for decreasing the time lag between the speed change of the prime mover and the corresponding positioning of the valve means.

11. In combination with a prime mover having valve means for regulating the supply of fluid thereto, a hydraulic motor for moving the valve means, means for supplying actuating fluid to the motor, a pilot valve for controlling the supply of actuating fluid to the motor, a follow-up lever connecting the pilot valve and the motor, a pressure responsive device for moving the pilot valve, pumping means driven by the prime mover and having a discharge conduit including a bleed-off valve connected to the pressure responsive device for moving the pressure responsive device in terms of speed change of the prime mover, a tank having a fluid space communicating with the discharge conduit and a movable member in the tank connected to the motor for changing the volume of said fluid space in the tank in terms of movement of the motor.

12. In combination with a prime mover having valve means for regulating the supply of fluid thereto, a hydraulic motor and a pilot valve for moving the valve means, a follow-up lever connecting the pilot valve and the motor, and means for moving the pilot valve in terms of speed change of the prime mover, said means comprising a fluid pump driven by the prime mover and having a discharge conduit with a bleed-off valve, a pressure responsive device subject to the pressure in the discharge conduit and including a member connected to the pilot valve, and a tank having a fluid space communicating with the pressure responsive device and a movable member connected to the motor for changing the volume of the fluid space in the tank in terms of movement of the motor.

13. In combination with a prime mover having valve means for regulating the supply of fluid thereto, a motor connected to the valve means, means including a pilot valve for supplying fluid to the motor, a follow-up lever connecting the pilot valve and the motor, a pressure responsive means, a lever connecting the pressure responsive means to the pilot valve, a fulcrumed lever connecting said lever to the motor, a pumping means driven by the prime mover and having a discharge conduit connected to the pressure responsive device, a tank having a fluid space communicating with the discharge conduit and a member in the tank connected to the fulcrumed lever for changing the volume of the fluid space in terms of movement of the motor.

ARCHIE W. LEVIE.